United States Patent
Wei et al.

(10) Patent No.: US 9,282,111 B1
(45) Date of Patent: *Mar. 8, 2016

(54) APPLICATION-BASED NETWORK TRAFFIC REDIRECTION FOR CLOUD SECURITY SERVICE

(71) Applicant: Trend Micro Incorporated, Tokyo (JP)

(72) Inventors: Shaohong Peter Wei, Sunnyvale, CA (US); Wayne Jensen, Morgan Hill, CA (US)

(73) Assignee: Trend Micro Incorporated, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/477,424

(22) Filed: Sep. 4, 2014

Related U.S. Application Data

(63) Continuation of application No. 13/536,774, filed on Jun. 28, 2012, now Pat. No. 8,892,766.

(51) Int. Cl.
*H04L 29/06* (2006.01)

(52) U.S. Cl.
CPC .......... *H04L 63/1408* (2013.01); *H04L 63/20* (2013.01)

(58) Field of Classification Search
CPC .............................. H04L 63/20; G06F 21/577
See application file for complete search history.

(56) References Cited

U.S. PATENT DOCUMENTS

| 8,582,567 B2* | 11/2013 | Kurapati et al. | 370/356 |
| 8,661,522 B2* | 2/2014 | Huston et al. | 726/13 |
| 8,862,699 B2* | 10/2014 | Bhatawdekar et al. | 709/219 |
| 8,869,300 B2* | 10/2014 | Singh et al. | 726/27 |

\* cited by examiner

*Primary Examiner* — Ayaz Sheikh
*Assistant Examiner* — Debebe Asefa
(74) *Attorney, Agent, or Firm* — Okamoto & Benedicto LLP

(57) ABSTRACT

A cloud security service is made available to endpoint computers. Network traffic from originating application programs running on endpoint computers are redirected to the cloud security service based on characteristics of the originating application programs. Network traffic from an originating application program may be redirected to the cloud security service by way of a virtual private network (VPN) tunnel or generic routing encapsulation (GRE) tunnel between an endpoint computer and a cloud computing system hosting the cloud security service, for example. Network traffic from an originating application program may also be routed from an endpoint computer to a gateway system, and then redirected from the gateway system to the cloud computing system. The cloud security service may drop or forward network packets of the network traffic depending on a result of scanning the network packets.

20 Claims, 5 Drawing Sheets

APPLICATION-BASED NETWORK TRAFFIC REDIRECTION FOR CLOUD SECURITY SERVICE

CROSS-REFERENCE TO RELATED APPLICATION

This application is a continuation of U.S. application Ser. No. 13/536,774, filed on Jun. 28, 2012, which is incorporated herein by reference in its entirety.

BACKGROUND OF THE INVENTION

1. Field of the Invention

The present invention relates generally to computer security, and more particularly but not exclusively to methods and apparatus for cloud security services.

2. Description of the Background Art

Cloud security services are computer security solutions that are hosted in the cloud. Cloud security services are appealing because they remove the need for customers to maintain their own hardware and software for providing computer security and archiving security event data. Capital costs as well as ongoing management for computer security infrastructure can be very expensive for some organizations, particularly those with many small branch offices that either need to purchase and manage a lot of redundant hardware or backhaul data to the central office, thereby introducing significant additional network latency.

Although cloud security services provide many benefits, the need to redirect network traffic to the cloud increases network latency and also routing complexity.

SUMMARY

In one embodiment, a cloud security service is made available to endpoint computers. Network traffic from originating application programs running on endpoint computers are redirected to the cloud security service based on characteristics of the originating application programs. Network traffic from an originating application program may be redirected to the cloud security service by way of a virtual private network (VPN) tunnel or a generic routing encapsulation (GRE) tunnel between an endpoint computer and a cloud computing system hosting the cloud security service, for example. Network traffic from an originating application program may also be routed from an endpoint computer to a gateway system, and then redirected from the gateway system to the cloud computing system. The cloud security service may drop or forward network packets of the network traffic depending on a result of scanning the network packets.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
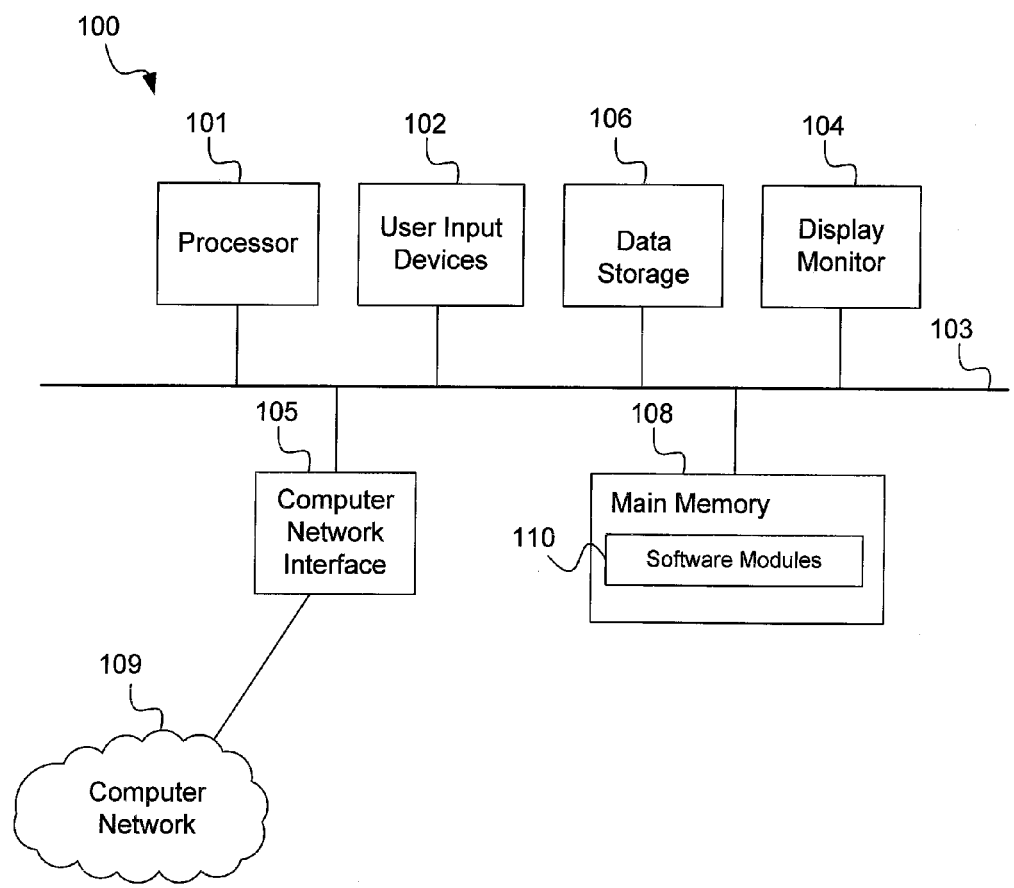
FIG. 1 shows a schematic diagram of a computer that may be employed with embodiments of the present invention.

FIG. 1 shows a schematic diagram of a computer 100 that may be employed with embodiments of the present invention. The computer 100 may be employed as an endpoint computer, a gateway system, or a cloud computing system, for example. The computer 100 may have fewer or more components to meet the needs of a particular application. The computer 100 may include one or more processors 101. The computer 100 may have one or more buses 103 coupling its various components. The computer 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor, cathode ray tube), a computer network interface 105 (e.g., network adapter, modem), and a main memory 108 (e.g., random access memory). The computer network interface 105 may be coupled to a computer network 109, which in this example includes the Internet.

The computer 100 is a particular machine as programmed with software modules 110. The software modules 110 comprise computer-readable program code stored non-transitory in the main memory 108 for execution by the processor 101. The computer 100 may be configured to perform its functions by executing the software modules 110. The software modules 110 may be loaded from the data storage device 106 to the main memory 108. The software modules 110 may also be made available on other computer-readable storage medium including optical disk, flash drive, and other memory devices.

Cloud hosted security solutions require some form of redirection of network traffic to the cloud security service. There are several methods for redirecting network traffic, each with its own drawback.

All network traffic may be redirected to the cloud security service. This method is not desirable because of increased demand for bandwidth and computation resources.

Another method of redirecting network traffic is to redirect all traffic from particular ports using a static port based approach. For example, all network traffic from TCP (transmission control protocol) port 80 may for redirected to the cloud security service. This approach is not reliable because HTTP (hypertext transfer protocol) traffic can go through non-port 80 and HTTP can be used to tunnel network traffic from various applications, from web browsers to P2P (peer to peer) file downloaders.

Another method of redirecting network traffic is to use deep packet inspection (DPI) based technology to identify application type through network traffic. However, it may take more than one packet to identify an application and it is difficult to manage different routes for packets at the pre- and post-classification stages.

Another method of redirecting network traffic is to change domain name service (DNS) mail exchange (MX) records to direct incoming e-mails to the hosted servers. This method is limited, as it is only useful for e-mails.

Another method of redirecting network traffic is to perform port forwarding from an edge router to redirect outbound traffic by destination port. A main drawback of this method is that if redirection is performed by port number, then client applications, such as malware or by an end-user looking to subvert acceptable use policy, may avoid content inspection by using non-standard ports. On the other hand, if network traffic on all ports is redirected, the latency added by the extra hop to the cloud security service may degrade the performance of some sensitive applications. Furthermore, this method only works for in-office computers, so out of the office computers (e.g., those employed by employees that are travelling) are unprotected.

Another method of redirecting network traffic is to configure individual proxy settings to forward browser-only traffic directly from endpoints. Although this method helps address travelling employees, it is only useful for hypertext transfer protocol (HTTP) traffic. Furthermore, if employed with a cloud security service that is hosted by a public cloud infrastructure, forwarding plaintext HTTP through the public cloud infrastructure may raise privacy concerns.

Edge or endpoint virtual private network (VPN) connections with split-routing configuration may be employed to securely forward network traffic to the cloud security service. This redirection method addresses issues relating to travelling employees and privacy, and enables sending of arbitrary network traffic based on destination port and domain. Still, like forwarding rules from an edge router, this method can be thwarted by use of non-standard ports if forwarding is based on destination port. If all traffic is forwarded, then latency may be an issue for the company and cost may be an issue for the cloud security service provider because a larger volume of traffic will need to be decrypted. Depending on VPN implementation and target device, an additional VPN client application may also need to be deployed.

Figure 2:
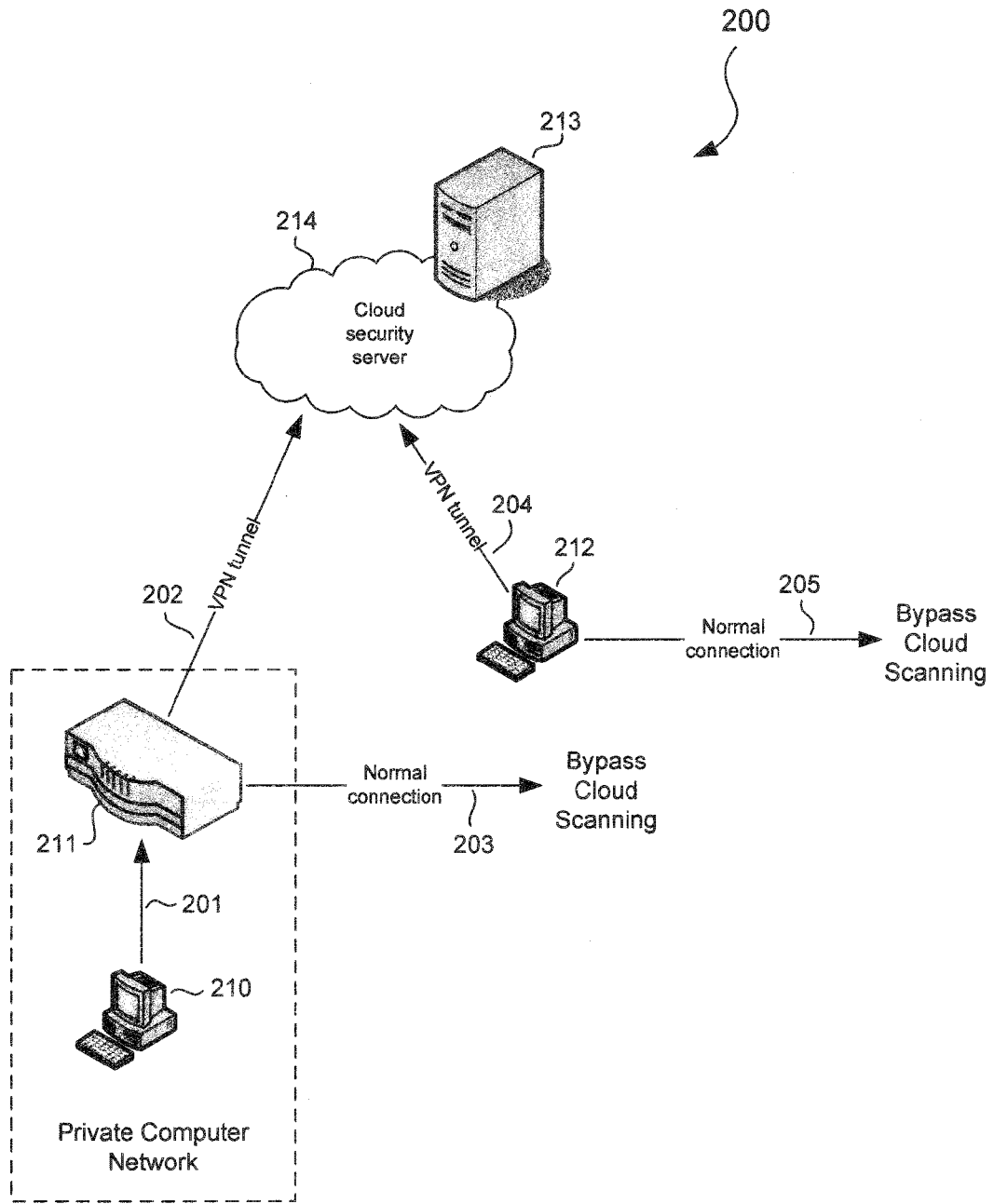
FIG. 2 shows a schematic diagram of a cloud-based computer security system in accordance with an embodiment of the present invention.

Referring now to FIG. 2, there is schematically shown a cloud-based computer security system 200 in accordance with an embodiment of the present invention. In the example of FIG. 2, the system 200 includes one or more endpoint computers 212 that selectively send network traffic to a cloud security server 214 for content scanning. The cloud security server 214 may comprise computer-readable program code for providing a cloud security service, such as antispam, antivirus, intrusion detection, content inspection, and content filtering, for example. The cloud security server 214 may perform its computer security functions using conventional algorithms. For example, the cloud security server 214 may perform antivirus scanning using a pattern matching algorithm. The cloud security server 214 is so named because it is hosted by a cloud computing infrastructure in the form of a cloud computing system 213. The cloud computing system 213 may comprise one or more server computers that host the cloud security server 214. In the example of FIG. 2, the cloud computing system 213 is part of a public cloud in that different, unrelated entities may subscribe to use the cloud security server 214 over the Internet.

In one embodiment, an endpoint computer 212 communicates with the cloud security server 214 by VPN tunneling. As is well known, VPN is a private computer network that interconnects remote computers through a public communication infrastructure, which in this example is the Internet. An endpoint computer 212 may also communicate with the cloud security server 214 by way of a generic routing encapsulation (GRE) tunnel or some other communication protocol.

In the example of FIG. 2, the endpoint computer 212 may send network traffic to the cloud security server 214 through a VPN tunnel (e.g., FIG. 4, VPN tunnel 406) over the Internet. In one embodiment, the endpoint computer 212 redirects network traffic to the cloud security server 214 based on the application program ("application") that originated the network traffic. As a particular example, the endpoint computer 212 may be configured to redirect network traffic of some applications to the cloud security server 214 by way of the VPN tunnel (see arrow 204). For other applications, the endpoint computer 212 may be configured to bypass in-the-cloud scanning and send the other applications' network traffic directly to its destination (see arrow 205).

In the example of FIG. 2, the system 200 may also include one or more endpoint computers 210 that send network traffic to a gateway system 211, which then selectively sends network traffic to the cloud security server 214 for content scanning. An endpoint computer 210 may be configured to provide the identity and characteristics of the application and network traffic generated by the application to the gateway system 211 to assist the gateway system 211 in making a decision on whether or not to redirect the network traffic to the cloud security server 214. The gateway system 211 and the endpoint computer 210 may communicate over a private computer network.

The gateway system 211, which may comprise one or more computers that connect endpoint computers 210 of a private computer network to the Internet, may communicate with the cloud security server 214 through a VPN tunnel (e.g., FIG. 5, VPN tunnel 506) over the Internet. The gateway system 211 may also communicate with the cloud security server 214 through a GRE tunnel or by using some other communication protocol. In one embodiment, the gateway system 211 redirects network traffic to the cloud security server 214 based on the application that originated the network traffic. As a particular example, the gateway system 211 may be configured to redirect network traffic of some applications to the cloud security server 214 by way of the VPN tunnel (see arrow 202). For other applications, the gateway system 211 may be configured to bypass in-the-cloud scanning and send the other applications' network traffic directly to its destination (see arrow 203).

Figure 3:
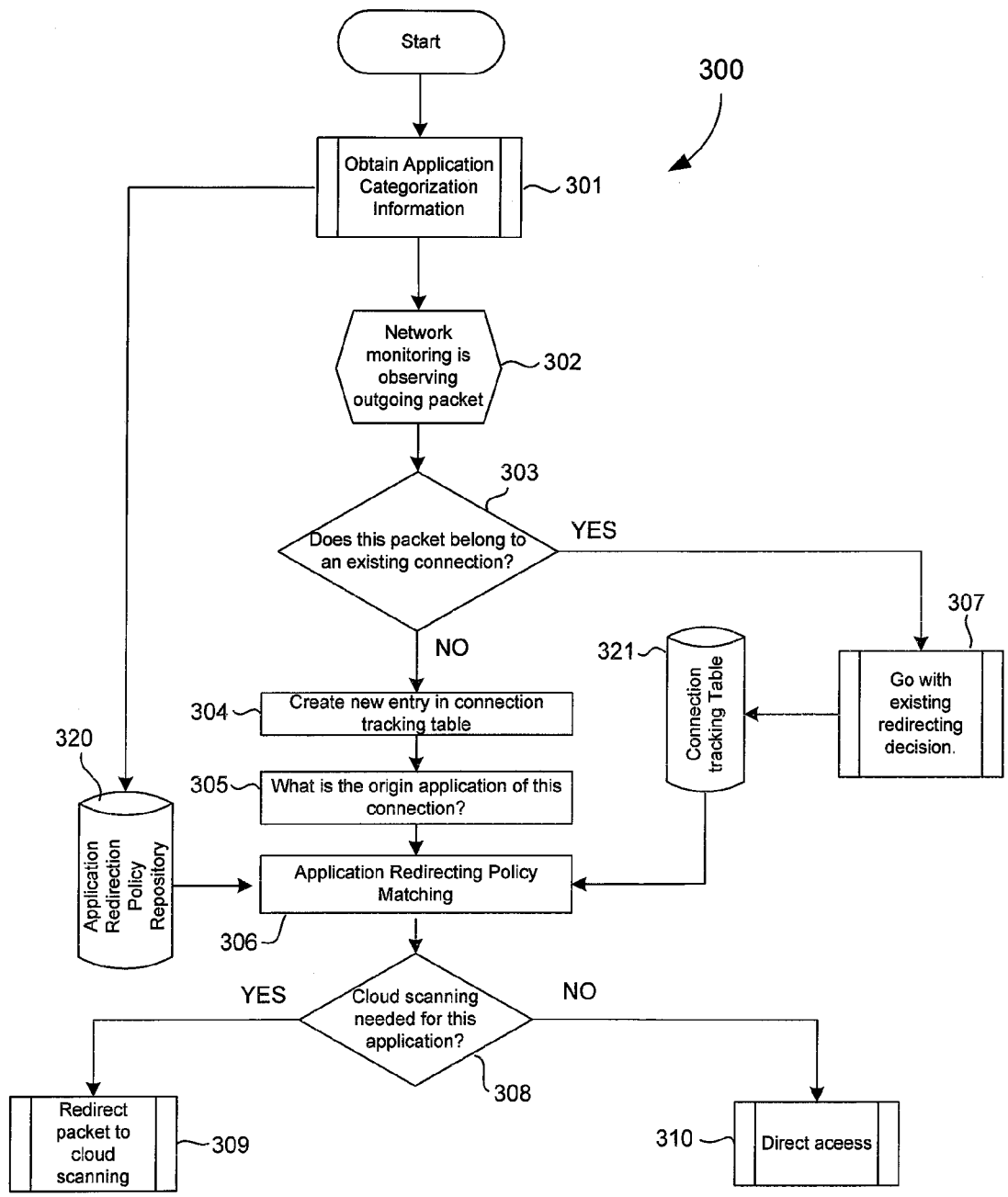
FIG. 3 shows a flow diagram of a method of redirecting network traffic to a cloud security service in accordance with an embodiment of the present invention.

FIG. 3 shows a flow diagram of a method 300 of redirecting network traffic to a cloud security service in accordance with an embodiment of the present invention. In the example of FIG. 3, categorization information are obtained for applications that originate network traffic and run on an endpoint computer, such as an endpoint computer 210 or 212 (step 301). An endpoint computer 212 or a gateway system 211 may determine whether or not to redirect network traffic originated by an application based on the characteristics of the application, which are described by the application's categorization information. Examples of static categorization information that may be collected for an application are shown in Table 1.

TABLE 1

| | |
|---|---|
| Vendor | Verified vendor of an application |
| Digital signature | Application signing status |
| Category | Certain categories such as gaming, IM, gambling has higher risk. |

TABLE 1-continued

| | |
|---|---|
| Vulnerabilities | Known vulnerabilities, patch status, known attacks, severity |
| Application source | Where an application is acquired: CD/DVD installation, Internet download etc. |
| History | Installation time, execution time and period |
| Local resource | Expected local resource access: file, folder, registry etc |
| Remote resource | Expected remote resource access: network connection, database, file server etc. |
| Sandbox | Discovery from running the software package under a Sandbox |

Examples of dynamic categorization information that may be collected for an application are shown in Table 2.

TABLE 2

| | |
|---|---|
| Local resource | Runtime local resource access: file, folder, registry, memory etc |
| Remote resource | Runtime remote resource access: network, database, file server etc |

An application's categorization information may be obtained directly from attributes of the application's file image, by an endpoint agent that monitors data archives, or from a remote manifest of files, such as from a file reputation server or a central application white-listing server, for example. Collected categorization information of various applications may be stored in an application redirection policy repository 320. The redirection policy repository 320 and a connection tracking table 321 may be locally or remotely stored.

Network traffic may be monitored to observe an outgoing network packet (step 302). The monitoring step and the rest of the steps of the method 300 may be performed by the computer that renders the decision on whether or not to redirect the network traffic to the cloud security service, which in this example is provided by the cloud security server 214. More specifically, steps 302-310 may be performed by an endpoint computer 212 or a gateway system 211, for example.

When the outgoing network packet does not belong to an existing connection, a new entry is created in the connection tracking table 321 to store metadata associated with the session associated with the packet (step 303 to step 304). The entry may identify connection information for TCP (transmission control protocol) packets, for example. For UDP (user datagram protocol) packets, packets with identical source IP (internet protocol) address and port, destination IP address and port, and layer 4 protocol type may be tracked as part of the same virtual connection if they occur within some window of time. The application that originated, i.e., originally created, the network packet is then identified (step 305). The application that originated the network packet may be identified using a conventional algorithm, such as that employed by the TCPView software for the MICROSOFT WINDOWS operating system or by the lsof software tool for the LINUX operating system. Other algorithms for mapping a process and a network connection may also be employed without detracting from the merits of the present invention.

Automated recommendations on whether or not to redirect network traffic originated by a specific application may be based on static categorization information gathered about the application. The redirection decision may be subject to override based on dynamic categorization information of the application gathered by a dynamic monitoring agent, or based on overriding information from other sources, such as overriding information from the cloud security service. Dynamic and static categorization information of the application and policies for redirection may be stored in the application redirection policy repository 320. The redirection policies may reflect preferences of the network administrator or rules that may be triggered based on dynamic categorization information of the application.

In one embodiment, to mitigate the latency and costs of redirecting network traffic to the cloud security service, only relevant network traffic are redirected to the cloud security service. Network traffic may be redirected or not based on characteristics of the application that originated the network traffic and redirection policies included in the policy repository 320. More specifically, characteristics of the application may be compared to the redirection policies to find matching redirection policies that apply to network traffic of the application (step 306). For example, a redirection policy stored in the policy repository 320 may indicate that network traffic originated from trusted applications will not be redirected to the cloud to the cloud security server 214, while network traffic from unknown, suspicious or vulnerable applications will be redirected to the cloud security server 214 for scanning. The categorization information of the application may be obtained from the policy repository 320 to determine whether the application is trusted (e.g., based on the application's digital signature, sandbox results, vendor), unknown, suspicious (e.g., based on the application's source, history), or vulnerable (e.g., based on the application's category, history, local and remote resource), for example.

The redirection of the outgoing network packet may be based on characteristics of the application that originated the network packet and the redirection policies that are in effect (step 306 to step 308). The network packet may be redirected to the cloud security server 214 for scanning when the redirection policies so indicate based on the application that originated the network packet (step 309). When the redirection policies indicate that the network packet does not need to be redirected for scanning based on characteristics of the application that originated the network packet, the network packet is sent towards its destination without having to pass through the cloud security server 214 (step 310).

When the outgoing network packet belongs to an existing connection (step 303 to step 307), the pre-existing redirection decision for the outgoing network packet is followed (step 307). The pre-existing connection for the outgoing network packet may be determined from the connection tracking table 321. For example, if the network packet is from an application whose network packets are redirected to the cloud security server 214, the outgoing network packet is also redirected to the cloud security server 214. Similarly, if the network packet is from an application whose network packets are not redirected to the cloud security server 214, the outgoing network packet also bypasses scanning by the cloud security server 214.

The cloud security server 214 may provide different cloud security services for network traffic based on the application that originated the network traffic. The categorization information of the application may be attached to its network traffic as application metadata to assist the cloud security server 214 to determine the type of content filtering to apply to the network traffic. For example, network traffic from known-vulnerable applications may be subjected to intrusion prevention filtering, while network traffic from unknown applications may be archived for future study or fingerprinted for comparison with network traffic from other sources.

As can be appreciated, the method 300 allows for efficient redirection of network traffic to a cloud security service, while being effective from the beginning of a network connection.

Figure 4:
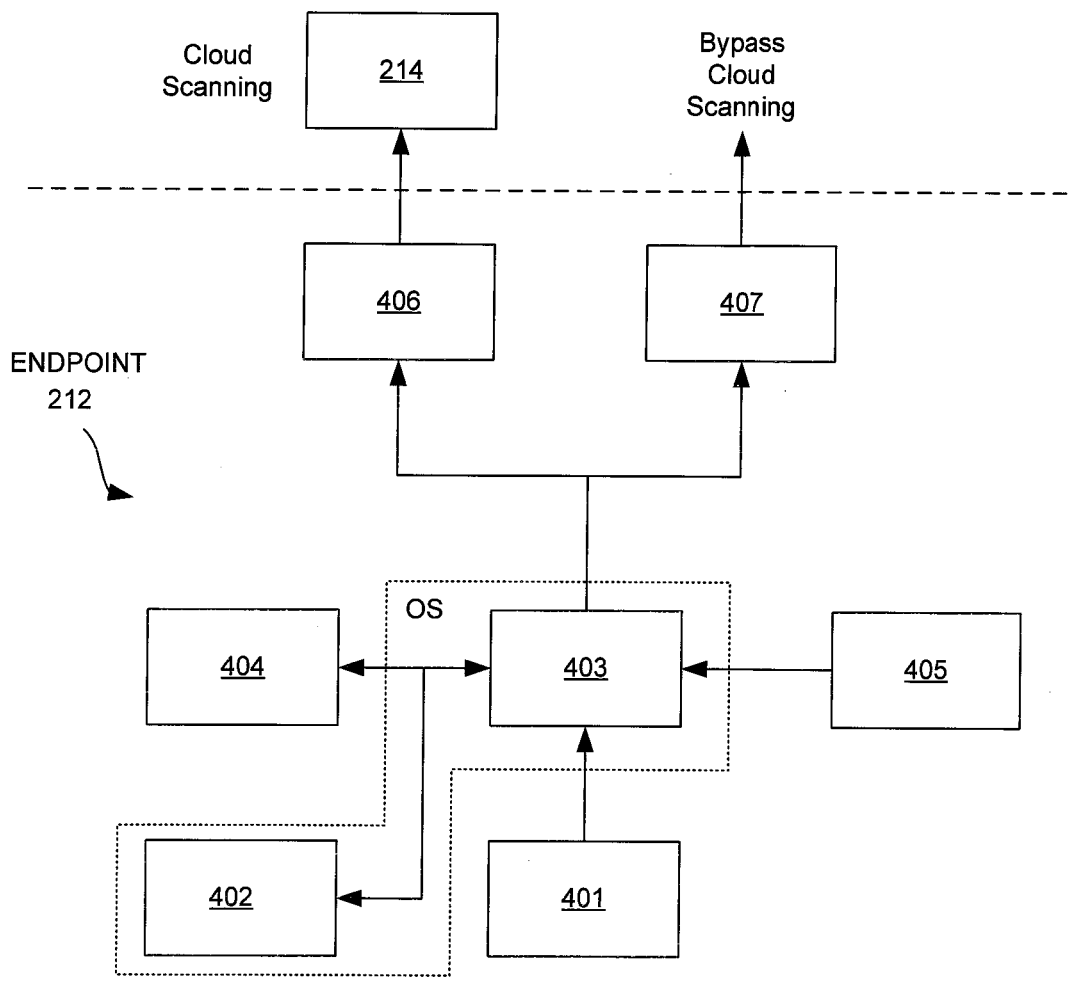
FIG. 4 shows a schematic diagram of an endpoint computer for redirecting network traffic to a cloud security service in accordance with an embodiment of the present invention.

FIG. 4 shows a schematic diagram of an endpoint computer 212 for redirecting network traffic to a cloud security service in accordance with an embodiment of the present invention. The endpoint computer 212 is so named because it runs the application program 401 that originally created the network traffic to be evaluated for redirection. The components 401-407 of the endpoint computer 212 shown in FIG. 4 may be implemented as computer-readable program code, for example. The endpoint computer 212 may thus be a programmed computer specifically configured to perform application-based redirection to a cloud security service.

In the example of FIG. 4, the application program 401 generates network traffic in the form of network packets for transmission over a computer network to a destination computer. A redirection decision application 403 makes decisions on whether to redirect the network traffic to the cloud security service for scanning or to pass the network traffic towards the destination computer without scanning by the cloud security service. The redirection decision application 403 makes its redirection decisions based on characteristics of the application that originated the network traffic. In the example of FIG. 4, the redirection decision application 403 consults a mapping application 402, a database 404, and an application categorization service 405 to make its redirection decisions. The redirection decision application 403 and the mapping application 402 may be separate modules, or integrated within the operating system of the endpoint computer 212.

The mapping application 402 maps a network session to the local application that originated the network traffic. The mapping application 402 allows the redirection decision application 403 to identify network packets originated by the application program 401 and other applications running on the endpoint computer 212.

The database 404 contains redirection policies to be applied to network traffic originating from the application program 401 and other applications running on the endpoint computer 212. Redirection policies may be based on multiple factors, not just on the category of the originating application. For example, redirection policies may be based on the currently logged on user or operator of the endpoint computer 212, the identity of the application as determined by filename or hash, the vendor of the application, the digital signature of the application, reputation or categorization of the application as provided by the application categorization service 405, destination address of the packet, and categorization information of the originating application. Yet another example, the same application category may result in a different redirection decision for different users, or for use at a different time of day, or if the specific application itself is different, such as a redirection policy to forward packets from "web browser" category applications except those from the GOOGLE CHROME web browser. Different redirection policies may also be applied to the same application depending on the destination address or port of the outbound packet, such as a redirection policy to forward web browser traffic to the cloud security service unless the destination port is 21.

The redirection decision application 403 may consult the mapping application 402 to determine that the application program 401 originated the packet, consult the categorization service 405 to establish the category or categories to which the application program 401 belongs, and then check if any redirection policies are defined in the database 404 that match the category of the application program 401. As a particular example, a redirection policy stored in the database 404 may indicate to the redirection decision application 403 to forward any packet sent by an application categorized as "Peer-to-Peer File Sharing" to the cloud security service. In that case, the packet originated by the application program 401 will be redirected to the cloud security service if the application program 401 is a "Peer-to-Peer File Sharing" program.

The redirection policies stored in the database 404 may be subject to change based on feedback information from an external source, such as the cloud security service. As a particular example, the cloud security service may have no efficacious filters for a specific application type, so the cloud security service may instruct clients, such as the redirection application 403, not to forward traffic from that application type. Alternately, the operators of the cloud security service may become aware of an emerging threat for a specific application, and instruct clients to forward all traffic from the affected application, at least temporarily, to the cloud security service.

The application categorization service 405 may take as input various characteristics of an application, such as file hash and digital signature, and return a categorization as an output. The categorization may indicate the category of the application (e.g., office productivity, gaming, collaboration and communication) or the reputation of the application. In one embodiment, the application categorization service 405 is a remotely hosted network service with fine grained categorization results. The application categorization service may be hosted by a computer system that is accessible over the Internet, for example. In another embodiment, the application categorization service 405 comprises a locally hosted list of applications and coarse grained results, such as "always redirect" or "never redirect" packets from particular applications, regardless of the category of the particular applications. In that case, the output of the application categorization service 405, in effect, serves as an override to redirection policies stored in the database 404.

By consulting the mapping application 402, the redirection decision application 403 identifies the outgoing network traffic as being originated by the application program 401. The redirection decision application 403 retrieves the categorization information of the application program 401 and finds matching redirection policies from the database 404. Based on the redirection policies, categorization information of the application program 401, and result from the application categorization service 405, the redirection decision application 403 routes the network traffic originated by the application program 401 to either a standard network connection 407 or the VPN tunnel 406 to the cloud security server 214. The standard network connection 407 may comprise a normal local or wide area network connection that bypasses cloud scanning by providing a network connection towards the original destination of the network traffic without having to pass through the cloud security server 214.

The VPN tunnel 406 may be provided, for example, by a VPN client running on the endpoint computer 212 and a VPN server running on the cloud computing system 213. In other embodiments, the VPN tunnel 406 may be replaced by a GRE tunnel or some other communication protocol. The redirection decision application 403 may attach application metadata (e.g., categorization information of the application) to network traffic redirected to the cloud security server 214 through the VPN tunnel 406. The cloud security server 214 subjects the network packets of the network traffic to various security filters, such as antivirus, intrusion detection, etc., and depending on the result of that filtering process may drop the network packets or forward them to their original destination.

Figure 5:
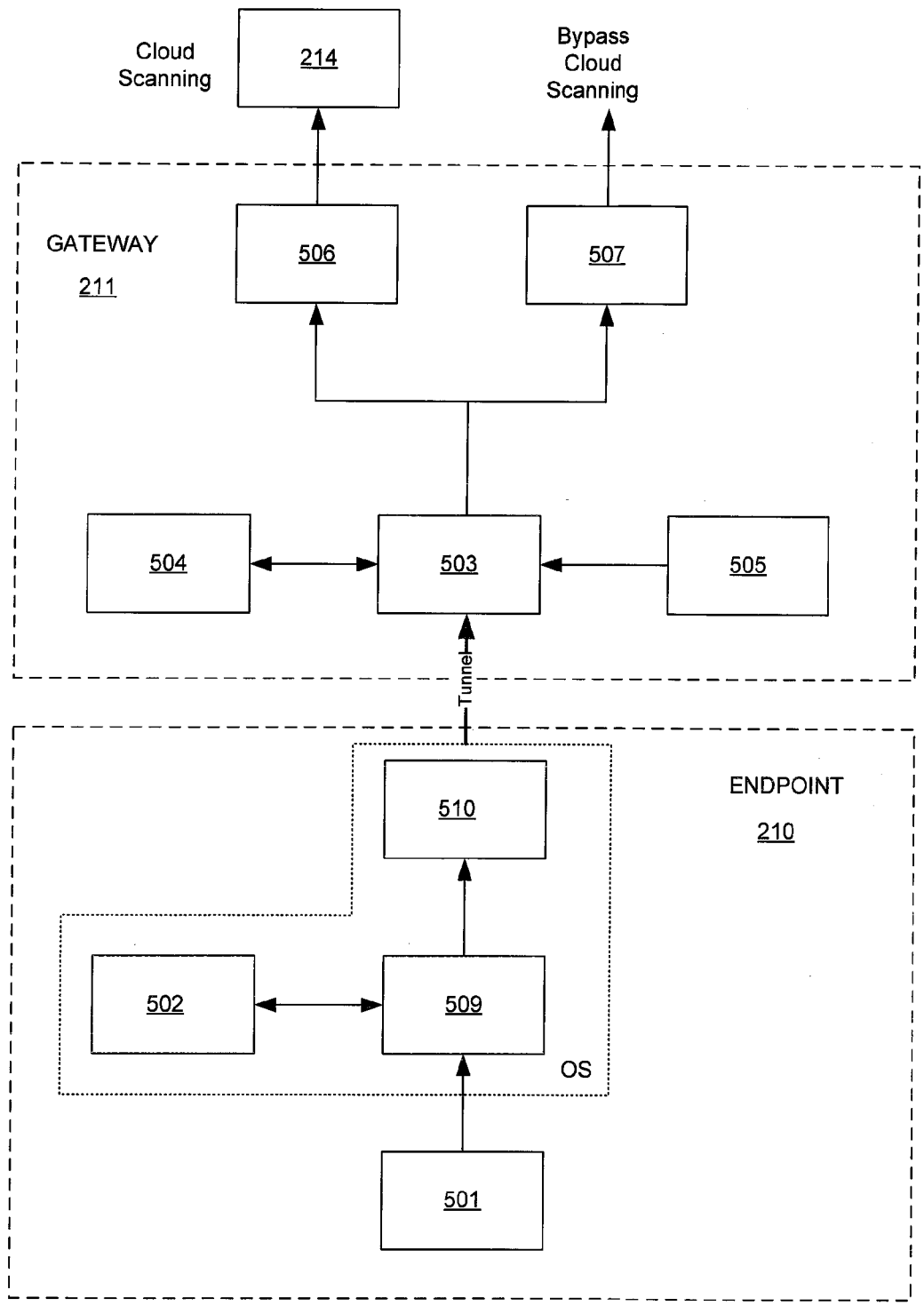
FIG. 5 shows a schematic diagram of a system for redirecting network traffic to a cloud security service in accordance with an embodiment of the present invention.

FIG. 5 shows a schematic diagram of a system for redirecting network traffic to a cloud security service in accordance with an embodiment of the present invention. In the example of FIG. 5, the system comprises the gateway system 211 and the endpoint computer 210. The endpoint computer 210 is so named because it runs the application program 501 that originally created the network traffic to be evaluated for redirection. The components 501, 502, 509, and 510 of the endpoint computer 210 shown in FIG. 5 may be implemented as computer-readable program code, for example. Similarly, the components 503-507 of the gateway system 211 may be implemented as computer-readable program code, for example. The gateway system 211 and the endpoint computer 210 may thus be programmed computers specifically configured to perform application-based redirection to a cloud security service.

In the example of FIG. 5, the application program 501 generates network traffic in the form of network packets for transmission over a computer network to a destination computer. An encapsulation application 509 encapsulates network packets from the application program 501 within another network protocol and transmits the encapsulated network packets across a tunnel 510 to the gateway system 211. The encapsulating protocol may include the identity (e.g., name) or other characteristics of the application program 501 that would otherwise not be visible to the remotely located redirection decision application 503. As a particular example, the encapsulation application 509 may encapsulate the network traffic originated by the application program 501, identity of the application program 501, and characteristics of the application program 501 in an encapsulation protocol to generate encapsulated network traffic and transmit the encapsulated network traffic to the gateway system 211 by way of the tunnel 510.

The mapping application 502 maps a network session to the local application that originated the network traffic. The mapping application 502 allows the encapsulation application 509 to identify network packets originated by the application program 501 and other applications running on the endpoint computer 210. The encapsulation application 509 forwards the network packet along with the identity and other characteristics of the application program 501 to the gateway system 211 by way of the tunnel 510. The functionality of the encapsulation application 509, the mapping application 502, and the tunnel 510 may be provided by stand-alone applications or by the operating system of the endpoint computer 210.

In the gateway system 211, the redirection decision application 503 makes decisions on whether to redirect received network traffic to the cloud security service for scanning or to pass the network traffic towards their original destination computer without scanning by the cloud security service. The redirection decision application 503 makes its redirection decisions based on characteristics of the application that originated the network traffic in a manner similar to the previously described redirection decision application 403. In the example of FIG. 5, the redirection decision application 503 retrieves the identity and characteristics of the application program 501 from the encapsulating protocol that was applied to the packets by the encapsulation application 509.

The database 504 contains redirection policies to be applied to network traffic originating from the application program 501 and other applications running on endpoint computers 210. The redirection policies stored in the database 504 may be similar to those stored in the previously described database 404. The application categorization service 505 provides an application categorization service similar to that provided by the previously described application categorization service 405.

The redirection decision application 503 identifies outgoing network traffic from the application program 501 from the encapsulation protocol. The redirection decision application 503 retrieves the categorization information of the application program 501 and finds matching redirection policies from the database 504. Based on the redirection policies, categorization information of the application program 501, and result from the application categorization service 505, the redirection decision application 503 routes the network traffic originated by the application program 501 to either a standard network connection 507 or the VPN tunnel 506 to the cloud security server 214. The standard network connection 507 may comprise a normal local or wide area network connection that bypasses cloud scanning by providing a network connection towards the original destination of the network traffic without having to pass through the cloud security server 214.

The VPN tunnel 506 may be provided, for example, by a VPN client running on the gateway system 211 and a VPN server running on the cloud computing system 213. In other embodiments, the VPN tunnel 506 may be replaced by a GRE tunnel or some other communication protocol. The redirection decision application 503 may attach application metadata to network traffic redirected to the cloud security server 214 through the VPN tunnel 506. The cloud security server 214 subjects the packets of the network traffic to various security filters, such as antivirus, intrusion detection, etc., and depending on the result of that filtering process may drop the packets or forward them to their original destination.

Methods and systems for redirecting network traffic to a cloud security service have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A cloud-based computer security system comprising:
    a computer that receives a first network traffic, identifies a first originating application program as an originator of the first network traffic, determines a characteristic of the first originating application program, compares the characteristic of the first originating application program with a redirection policy, and redirects the first network traffic to a cloud computing system based on a result of the comparison of the characteristic of the originating application program with the redirection policy,
    wherein the computer further receives a second network traffic, identifies a second originating application program that is different from the first originating application program as an originator of the second network traffic, determines a characteristic of the second originating application program, compares the characteristic of the second originating application program with the redirection policy, and does not redirect the second network traffic to the cloud computing system based on a result of the comparison of the characteristic of the second originating application program with the redirection policy; and
    the cloud computing system, the cloud computing system receives the first network traffic and scans the first network traffic to perform a computer security service.

2. The system of claim 1, wherein, the cloud computing system scans the first network traffic for intrusion detection.

3. The system of claim 1, wherein the cloud computing system scans the first network traffic to perform content filtering.

4. The system of claim 1, wherein the cloud computing system either drops or forwards to a destination computer packets of the first network traffic based on a result of the scanning.

5. The system of claim 1, wherein the cloud computing system receives the first network traffic and the second network traffic through a tunnel between the cloud computing system and the computer.

6. The system of claim 5, wherein the computer forwards the second network traffic to its intended destination over a network connection that is not through the tunnel.

7. The system of claim 1, wherein the computer receives the first and second network traffic from another computer.

8. The system of claim 7, wherein the computer comprises a gateway system.

9. The system of claim 1, wherein the computer comprises an endpoint computer that runs the first originating application program and the second originating application program.

10. A cloud-based computer security system comprising:
an endpoint computer running a first originating application program and a second originating application program, the endpoint computer receives a first network traffic and a second network traffic, identifies the first originating application program as an originator of the first network traffic, identifies the second originating application program as an originator of the second network traffic, and provides to a gateway system the first network traffic, an identity of the first originating application program as the originator of the first network traffic, the second network traffic, and an identity of the second originating application program as the originator of the second network traffic;
the gateway system in a same private computer network as the endpoint computer, the gateway system receives the first network traffic, the second network traffic, the identity of the first originating application program, and the identity of the second originating application program, compares a characteristic of the first originating application program with a redirection policy, and redirects the first network traffic to a cloud computing system based on a result of the comparison of the characteristic of the first originating application program with the redirection policy,
wherein the gateway system further compares a characteristic of the second originating application program with the redirection policy and does not redirect the second network traffic to the cloud computing system based on a result of the comparison of the characteristic of the second originating application program with the redirection policy; and
the cloud computing system, the cloud computing system receives the first network traffic and scans the first network traffic to perform a computer security service.

11. The system of claim 10, wherein the cloud computing system scans the first network traffic for intrusion detection.

12. The system of claim 10, wherein the cloud computing system either drops or forwards to a destination computer packets of the first network traffic based on a result of the scanning.

13. The system of claim 10, wherein the cloud computing system receives the first network traffic through a virtual private network (VPN) tunnel between the gateway system and the cloud computing system.

14. The system of claim 10, wherein the gateway system receives the first network traffic and the second network traffic through a tunnel between the gateway system and the endpoint computer.

15. The system of claim 14, wherein the gateway system forwards the second network traffic to its destination over a network connection that is not through the tunnel.

16. A cloud-based computer security system comprising:
a first computer that receives a first network traffic that is originated by a first originating application program, determines a characteristic of the first originating application program, compares the characteristic of the first originating application program with a redirection policy to generate a first result, and redirects the first network traffic to a cloud computing system through a tunnel between the first computer and the cloud computing system based on the first result,
wherein the first computer further receives a second network traffic that is originated by a second originating application program that is different from the first originating application program, compares a characteristic of the second originating application program with the redirection policy to generate a second result, and forwards the second network traffic to its destination over a network connection that does not go through the tunnel to bypass the cloud computing system based on the second result; and
the cloud computing system, the cloud computing system receives the first network traffic and scans the first network traffic to perform a computer security service.

17. The system of claim 16, wherein, the first computer further receives a third network traffic that is originated by the first originating application program and redirects the third network traffic to the cloud computing system based on the first result.

18. The system of claim 16, wherein the first computer receives the first network traffic and the second network traffic from a second computer.

19. The system of claim 16, wherein the first computer runs the first originating application program and the second originating application program.

20. The system of claim 16, wherein the first computer comprises a gateway system.

* * * * *